(12) United States Patent
Fuderer et al.

(10) Patent No.: US 12,449,495 B2
(45) Date of Patent: Oct. 21, 2025

(54) MAGNETIC RESONANCE EXAMINATION METHOD

(71) Applicant: KONINKLIJKE PHILIPS N.V., Eindhoven (NL)

(72) Inventors: Miha Fuderer, Bunnik (NL); Jacques Den Boer, Son (NL); Filips Van Liere, Best (NL)

(73) Assignee: Koninklijke Philips N.V., Eindhoven (NL)

( * ) Notice: Subject to any disclaimer, the term of this patent is extended or adjusted under 35 U.S.C. 154(b) by 176 days.

(21) Appl. No.: 18/274,773

(22) PCT Filed: Jan. 24, 2022

(86) PCT No.: PCT/EP2022/051413
§ 371 (c)(1),
(2) Date: Jul. 28, 2023

(87) PCT Pub. No.: WO2022/161882
PCT Pub. Date: Aug. 4, 2022

(65) Prior Publication Data
US 2024/0085508 A1 Mar. 14, 2024

(30) Foreign Application Priority Data
Feb. 1, 2021 (EP) .................... 21154481

(51) Int. Cl.
*G01R 33/56* (2006.01)
*G01R 33/58* (2006.01)

(52) U.S. Cl.
CPC ....... *G01R 33/5608* (2013.01); *G01R 33/583* (2013.01)

(58) Field of Classification Search
CPC .................. G01R 33/5608; G01R 33/583
See application file for complete search history.

(56) References Cited

U.S. PATENT DOCUMENTS

| 10,353,023 B2 * | 7/2019 | Nielsen | G01R 33/246 |
| 10,578,700 B2 * | 3/2020 | Popescu | G01R 33/5608 |
| 2016/0146918 A1 * | 5/2016 | Chen | G01R 33/5608 |
| | | | 324/309 |

FOREIGN PATENT DOCUMENTS

WO 2018204404 A1 11/2018

OTHER PUBLICATIONS

Sebastien Bar et al.: "Intrinsic Diffusion Sensitivity of the bSSFP Signal: Influence of Strong Phase Encoding Gradients on Image SNR", Proceedings of the International Society for Magnetic Resonance in Medicine, ISMRM, Joint Annual Meeting ISMRM-ESMRMB, Milan, Italy, May 10-16, 2014, No. 4324, Apr. 28, 2014 (Apr. 28, 2014), XP040671097.

(Continued)

*Primary Examiner* — Gregory H Curran

(57) ABSTRACT

A magnetic resonance examination method comprises acquisition of a set of magnetic resonance signals from magnetic spins in an object by way of a receiver antenna, the magnetic resonance signals' signal levels are related to an independent reference level that is independent of the receiver antenna's sensitivity to form a calibrated signal level of the magnetic resonance signals, the calibrated signal levels are recorded in terms of a relative density of ordered transverse spins (DOTS). The independent reference level may be derived from the signal-to-thermal-noise ratio. The calibrated signal level in terms of DOTS in μM/T reflects predominantly a tissue property (of (a voxel of) the patient to be examined) as well as details or characteristics of the acquisition sequence used.

12 Claims, 2 Drawing Sheets

(56) References Cited

OTHER PUBLICATIONS

Lei Zhao et al.: "SNR Analysis of Orthogonal Encoding Methods for Hyperpolarized Noble Gas MRI", Proceedings of the International Society for Magnetic Resonance in Medicine, ISMRM, 8th Scientific Meeting and Exhibition, Philadelphia, PA, USA, Apr. 1-7, 2000, Apr. 1, 2000 (Apr. 1, 2000), XP040582373.
Zelinski AC, Wald LL, Setsompop K, Goyal VK, Adalsteinsson E. Sparsity-enforced slice-selective MRI RF excitation pulse design. IEEE Trans Med Imaging. Sep. 2008;27(9):1213-29. doi: 10.1109/TMI.2008.920605. PMID: 18779063; PMCID: PMC2666002.
International Search Report and Written Opinion from PCT/EP2022/051413 mailed Mar. 30, 2022.
Purvis et al "Feasibility of Absolute Quantification for 31P MRS at 7T" Magnetic Resonance in Med. vol. 82, No. 1, Jul. 18, 2019 p. 49-61.

Edelstein et al "A Signal to Noise Calibration Procedure for NMR Imaging Systems" Medical Physics, vol. 11, No. 2 Mar. 1, 1984 p. 180-185.
Tofts et al "Spectroscopy:1H Metabolite Concentrations Quantitative MRI of the Brain" Oct. 3, 2003.
Van Heteren et al "Application of an Equivalent Circuit to Signal to Noise Calculations in MRI" Magnetic Resonance Imaging, vol. 5, No. 2 Jan. 1, 1987 p. 1010-108.
Brief et al "Signal to Noise for in Vivo MRI of Hyperpolarized 3He Gas at 1.5T and 0.1T" Proceedings of the Int. Soc. for Magnetic Resonance in Med. Jun. 26, 2003.
Alexander John Taylor et al "A Method for Determining the Detection Limits and Sensitivity in a 19F MR Experiment" Proceedings of the Int. Soc. for Magnetic Resonance in Med., May 2014.

* cited by examiner

MAGNETIC RESONANCE EXAMINATION METHOD

CROSS REFERENCE TO RELATED APPLICATIONS

This application is a U.S. national phase application of International Application No. PCT/EP2022/051413 filed on Jan. 24, 2022, which claims the benefit of EP Application Serial No. 21154481.2 filed on Feb. 1, 2021 and is incorporated herein by reference.

FIELD OF THE INVENTION

The invention pertains to a magnetic resonance examination method comprising:
acquisition of a set of magnetic resonance signals from magnetic spins in an object by way of a receiver antenna and
relating the magnetic resonance signals' signal levels to a reference level that is independent of the receiver antenna's sensitivity.

BACKGROUND OF THE INVENTION

Such a magnetic resonance examination method is known from the paper 'Feasibility of absolute quantification for 31P MRS at 7 T' in Magn. Reson. Med. 82(2019)49-61, by L. A. B Purvis et al.

This paper concerns a magnetic resonance spectroscopy method. Metabolite concentrations are calculated by normalising the acquired MR spectral signal and calibrating it to a reference of known concentration. An external reference can be known precisely. This known MR spectroscopy method allows precise metabolite quantification that is independent of the operator site or scanner vendor.

SUMMARY OF THE INVENTION

An object of the present invention is to provide a magnetic resonance examination method that allows quantitative assessment of acquired magnetic resonance signals.

This object is achieved by the magnetic resonance examination method of the invention comprising:
acquisition of a set of magnetic resonance signals from magnetic spins in an object by way of a receiver antenna,
relating the magnetic resonance signals' signal levels to an independent reference level that is independent of the receiver antenna's sensitivity to form a calibrated signal level of the magnetic resonance signals and
recording the calibrated signal levels in terms of a relative density of ordered transverse spins (DOTS).

The calibration of the magnetic resonance signals to the reference and the representation of the calibrated signal level in terms of a relative density of the quantity ordered transverse spins (DOTS) in microMolar/Tesla (µM/T) (or other appropriate units) achieves that the calibrated signal level relates, apart from pre-determined aspects of the acquisition sequence, predominantly to a property of the object (e.g. on a per voxel basis) to be examined. The magnetic resonance examining method involves to apply a (usually strong, stationary and uniform) magnetic field that produces different energy levels for the individual nuclear spins. The excess anti-parallel spins may be excited in that they are rotated to a transverse orientation by way of an electromagnetic alternating (typically radiofrequency) field pulse. After termination of this RF-pulse, the magnetization relaxes back to equilibrium as the magnetization starts to build-up again. The temporal variations of the magnetization can be detected by one or more RF receiving coils. Note that the difference (i.e. the excess spins orientated anti-parallel to the main magnetic field) between the numbers of anti-parallel spins and the number of parallel orientated spins excited spins at room temperature in very good approximation scales linearly with the magnetic field strength. Hence, the relative density of ordered transverse spins in which the number of ordered transverse spins scaled linearly with the magnetic field strength is independent of the magnetic field strength. When the object is a patient to be examined, the calibrated signal level in terms of DOTS in e.g. µM/T reflects predominantly a tissue property (of (a voxel of) the patient to be examined) as well as details or characteristics of the acquisition sequence used rather than being affected as well by aspects of the magnetic resonance examination system that is employed to carry out the magnetic resonance examination method of the invention. For example, a combination of tissue property and sequence property: with lower flip-angle, will have a lower DOTS; after a time much longer than the transverse relaxation time $T_2$, the 'order' will be less, also leading to a lower DOTS. This is inherently a property of both sequence and tissue. A magnetic resonance image reconstructed from these magnetic resonance signals (in DOTS), has brightness values that do not depend on details of the reconstruction process. For a given sequence, the quantity DOTS expressed in e.g. µM/T in magnetic resonance examinations may be regarded as corresponding to the x-ray attenuation expressed in Hounsfield values in x-ray computed-tomography. The present invention is data-driven by MR data and does not require separate samples for calibration.

Notably, the invention may involve acquisition of two or more sets of magnetic resonance signals from magnetic spins in the object. This acquisition may be done with the same or different receiver antennae, even at different individual magnetic resonance examination systems and at different times, e.g., different stages of the disease to be diagnosed. Because according to the invention, the signal levels are in terms of DOTS for both or all of the sets of magnetic resonance signals, they can be compared in a meaningful way. Of course, this comparison is not dependent of the unit in which the DOTS is expressed whether µM/T, nM/T or even pM/T might be more appropriate, but also something like "molecules per mm$^3$ per Tesla" or the like. The quantity DOTS refers directly to the concentration of coherent spins that contribute to the magnetic resonance signals acquired.

These and other aspects of the invention will be further elaborated with reference to the embodiments defined in the dependent Claims.

A preferred implementation of the magnetic resonance examination method of the invention includes
determination of the independent reference level from a measurement of the signal-to-thermal-noise ratio of the receiver antenna and
calibrate the measured signal-to-thermal-noise ratio in terms of the relative density of ordered transverse spins (DOTS) by relating the measured signal-to-thermal-noise ratio to a computed theoretical signal-to-thermal-noise ratio.

This implementation is based on an insight that the signal-to-thermal-noise ratio, i.e. the ratio of the signal level of the voltage induced by a nuclear magnetization (over a small volume) to the thermal-noise level due to the antenna itself, can be the theoretically computed for a fixed virtual sample of a fully relaxed and then fully excited chosen substance, preferably water. The example of water is a non-limiting example in the case of proton $^1$H imaging. (in the case of deuterium, it would be "heavy water", in the case of $^{13}$C it might be e.g. fully-13C-enriched pyruvate etc. Thus the signal level of any actual experiment may be expressed in terms of the SNR of the fixed same fictitious sample, which forms the basis of the absolute signal level. This implementation may be practically employed by determining, by a measurement, the signal level as well as the level of the received thermal-noise and thus the ratio between these two quantities and compute the theoretically expected ratio between signal and noise for a given density of ordered transverse spins (e.g. for 1 µM, or for the concentration of excess spins of pure water) and obtaining the ratio between the measured signal-to-thermal-noise ratio and the theoretically determined signal-to-thermal-noise ratio. This procedure leads to an 'absolute sensitivity of the system', which is theoretically expected SNR relative to the thermal-noise level of experiment.

A further preferred implementation of the magnetic resonance examination method of the invention includes accessing the receiver antenna's resonance quality factor and compute the computed theoretical thermal-noise level from the receiver antenna's resonance quality factor. This implementation employs that the measured thermal-noise level of the receiver antenna is dependent on the resonance quality factor of the inductively loaded receiver antenna. An insight of this implementation is that the actual inductive load caused by coupling of the load to the receiver coil is adequately represented by the resonant quality factor that may be determined by a simple separate measurement. Thus, the measurement of the resonant quality factor provides sufficient information on the actual coupling of the load (patient to be examined) to the receiver coil. The signal-to-thermal-noise ratio for the acquisition sequence at hand and the receiver coil (viz. the loaded receiver coil's quality factor) provides an absolute reference level in terms of DOTS. Further, the signal-to-thermal-noise ratio of the loaded receiver coil is linear in the DOTS. Hence the signal-to-thermal-noise ratio of the acquired magnetic resonance signals for the acquisition sequence and the coil (loading) at hand may be related to the absolute signal-to-thermal-noise ratio which is expressed in absolute terms of DOTS. Thus, the comparison between the measured thermal-noise level and the computed theoretical thermal-noise level, employing the actual resonance quality factor of the receiver antenna returns results for the measured thermal-noise level in terms of DOTS and calibrated to the absolute reference level.

In another variation, the invention may be implemented as a preferred implementation of the magnetic resonance examination method of the invention includes determination of the independent reference level from a measurement of the signal-to-thermal-noise level of the receiver antenna. That is, the determination of the independent reference level from the may be done independently from recording the calibrated signal levels in terms of the of the relative density of ordered transverse spins (DOTS), that is e.g. in terms of the voltage measured due to the signal and the thermal-noise. Such an approach without employing the recording in terms of the DOTS may be useful for meaningful comparison of pixel-values of reconstructed images from magnetic resonance signals acquired by the same magnetic resonance examination system.

A practical implementation is to derive its value form the resonance quality factor from the receiver antenna's resonance response characteristic, notably from the width of frequency width of the resonance response. This resonance response characteristic may be obtained from a simple experiment in which the inductively loaded receiver antenna's response is measured due to application of a narrow bandwidth tuning signal that is varied over a range of frequencies. The frequency range may extend over about 2 to 5% of the Larmor frequency and having the range's center at about the Larmor frequency.

The calibration of the signal levels of magnetic resonance signals that are acquired by the receiver antenna may be achieved by relating these acquired signal levels to reference signal levels of corresponding magnetic resonance signals acquired by a reference receiver antenna having a stable and spatially uniform absolute sensitivity profile. The reference signals may be acquired by way of the same acquisition sequence that generates the magnetic resonance signals to be calibrated. This absolute sensitivity profile may be determined by relating to the received magnetic resonance signal's signal-to-thermal-noise of the reference receiver antenna (e.g. a quadrature body coil (QBC). In more detail.

The proposed magnetic resonance examination method can also be applied if the sensitivity of a receiver antenna is position-dependent, called 'local antenna' in the sequel. In practice, there may be a multiplicity of these. This can be done by relating the signals of the local antenna to that of a receiver antenna having a stable and spatially uniform absolute sensitivity profile, called 'reference antenna' in the sequel; this may e.g. be a quadrature body coil (QBC). This relation can be established by way of a fast calibration scan (e.g. a 'SENSE reference scan') that acquires and reconstructs position-dependent signals (a.k.a. 'images') of the reference antenna as well as of the local antenna.

As in the preceding paragraphs, the embodiment allows to estimate the absolute sensitivity of the reference antenna by $$s_{cal,ref} = SNR_{cal,ref,theor} \cdot \sigma_{cal,ref}$$

Here, $s_{cal,ref}$ should be read as "the absolute sensitivity of the reference antenna in the calibration scan setup"; SNR is the aforementioned theoretically estimated signal-to-thermal-noise ratio for one unit of ordered transverse spin density (or DOTS); and $\sigma_{cal,ref}$ is the observed noise in the reconstructed signal of the reference antenna in the calibration scan setup.

The calibration scan results in two images, called $p_{cal,loc}(x)$ and $p_{cal,ref}(x)$. These both contain a common factor $\rho_{cal}(x)$ which is diagnostically uninteresting and unknown; but that is not an issue since it divides out of the ratio of these two results $p_{cal,loc}(x)/p_{cal,ref}(x)$. This allows to calculate the sensitivity of the local coil in the user selected imaging scan setup (note the dependency on x) as $$s_{scan,loc}(x) = \frac{p_{cal,loc}(x)}{p_{cal,ref}(x)} \cdot s_{cal,ref} \cdot r_{scan/cal}$$

Note that the last factor ($r_{scan/cal}$) accounts for difference in signal due to the difference of the acquisitions.

The ratio $r_{scan/cal}$ is defined as $s_{scan,loc}/s_{cal,loc}$. In equivalence to $s_{cal,ref}$, the terms $s_{scan,loc}$ has to be read as "the absolute sensitivity of the local antenna in the user selected imaging scan setup", while $s_{cal,loc}$ is "the absolute sensitivity of the local antenna in the calibration scan setup". Also in equivalence to $s_{cal,ref}$, we define $s_{scan,loc}$ as $s_{scan,loc}=SNR_{scan,loc,theor} \cdot \sigma_{scan,loc}$ and equivalently $s_{cal,loc}=SNR_{cal,loc,theor} \cdot \sigma_{cal,loc}$. The values of $\sigma_{scan,loc}$ and $\sigma_{cal,loc}$ can be measured, just like the value of $\sigma_{cal,ref}$ which has been mentioned before. In order to calculate $r_{scan/cal}$, the ratio $SNR_{scan,loc,theor}/SNR_{cal,loc,theor}$ is needed. In view of equation (2) below, this ratio is expressed as $$\frac{SNR_{scan,loc,theor}}{SNR_{cal,loc,theor}} = \frac{\sqrt{N_{p,scan}N_{a,scan}N_{s,scan}}\sqrt{\frac{Q}{\Delta f_{scan}}}V_{s,scan}K_{sys}F(T)K}{\sqrt{N_{p,cal}N_{a,cal}N_{s,cal}}\sqrt{\frac{Q}{\Delta f_{cal}}}V_{s,cal}K_{sys}F(T)K} = $$

$$\frac{\sqrt{\frac{(N_{p,scan}N_{a,scan}N_{s,scan})}{\Delta f_{scan}}}V_{s,scan}}{\sqrt{\frac{(N_{p,cal}N_{a,cal}N_{s,cal})}{\Delta f_{cal}}}V_{s,cal}}$$

Since the considered local coil ("loc"), coil load and system properties are identical for the two scans, the ratio reduces to a ratio of known scan properties like voxel size, number of samples and bandwidth.

The mentioned ratio is calculated as $$r_{scan/cal} = \frac{SNR_{scan,loc,theor}}{SNR_{cal,loc,theor}} \cdot \frac{\sigma_{scan,loc}}{\sigma_{cal,loc}};$$

the first ratio is known from scan parameters and the second follows from measured noise values.

In an alternative way, the absolute sensitivity of the reference receiver antenna is determined by relating the receiver magnetic resonance signals to the reference receiver antenna's response to a well-controlled signal emitted in the magnetic resonance frequency band by a separate transmit antenna, such as a so-called tickler coil.

In another way, the absolute sensitivity of the reference receiver antenna is determined by relating the receiver magnetic resonance signals to signal levels due to tissue of the patient to be examined of which the type of tissue is determined separately. This may e.g. be carried out by applying a water-fat separation and the fact that the maximum proton density of water and fat, respectively, are fixed.

In a preferred implementation, respective sets of calibrated signals recorded in DOTS are compared. These respective sets of calibrated signals originate from multiple acquisitions of sets magnetic resonance signals under respective acquisition circumstances. These circumstances pertain to the physical conditions under which magnetic resonance signals are acquired, such the physical conditions of the subject to be imaged, the physical conditions that ensue form the static magnetic field and the various radio frequency (RF) and gradient magnetic fields associated with the acquisition sequences, and the characteristics of the signal acquisition chain such as the spatial sensitivity profiles of the receiver antenna and the gain settings and transfer characteristics of the electronic receiver chain. The calibrated signal levels are recorded in DOTS and represented in e.g. µM/T, the calibrated signal levels relate only to aspects of the object, e.g. tissue types of a patient to be examined and of details of the acquisition sequence used, while independent of the individual magnetic resonance examination system. Hence the calibrated signal levels in DOTS are themselves appropriate to carry out longitudinal studies involving different individual patients and different individual magnetic resonance examination systems.

The invention is based on the insight to express magnetic resonance signals in the quantitative density of ordered spins (DOTS), rather than in their measured electromagnetic signal strength such as electrical potential. The quantity of ordered transverse spins (DOTS) may be expressed in the unit microMolar/Tesla (µM/T) (like the electrical potential may be expressed in mV). The technical step of expressing in DOTS brings about the technical effect that different sets of magnetic resonance signals when expressed in DOTS may be meaningful compared without the need of involving a calibration sample in the acquisition of the magnetic resonance signal. This comparison may be between different receiver antennae with different sensitivity profiles, and even in different magnetic resonance examination systems, which may be from different system manufactures.

In further detailed implementations a magnetic resonance image may be reconstructed from the calibrated signals recorded in DOTS or a magnetic resonance image may be reconstructed form the acquired magnetic resonance signals and the brightness values of the magnetic resonance image are expressed in DOTS. Thus, the calibration of the signal levels and the representation in DOTS may be done in k-space as well as in image space.

In a preferred implementation of the invention, the temperature of the object during acquisition of the magnetic resonance signals is recorded. That is, the temperature is recorded at which the magnetic resonance signals are acquired and which plays a role in the excess of anti-parallel orientated spins. In the recording of the calibrated signal levels the recorded temperature is taken into account. Because the relative population difference between spins that are anti-parallel or parallel orientated with respect to a main magnetic field is temperature dependent, the density of ordered transverse spins is temperature dependent. Because the temperature is taken into account in the calibrated signal levels recorded in terms of DOTS, results from different magnetic resonance examinations at different temperatures can be meaningfully compared. This feature may be useful for accurately monitoring of preparation at cryogen temperature of hyperpolarization of a sample of hyperpolarized contrast agent.

These and other aspects of the invention will be elucidated with reference to the embodiments described hereinafter and with reference to the accompanying drawing wherein.

DETAILED DESCRIPTION OF EMBODIMENTS

Figure 1:
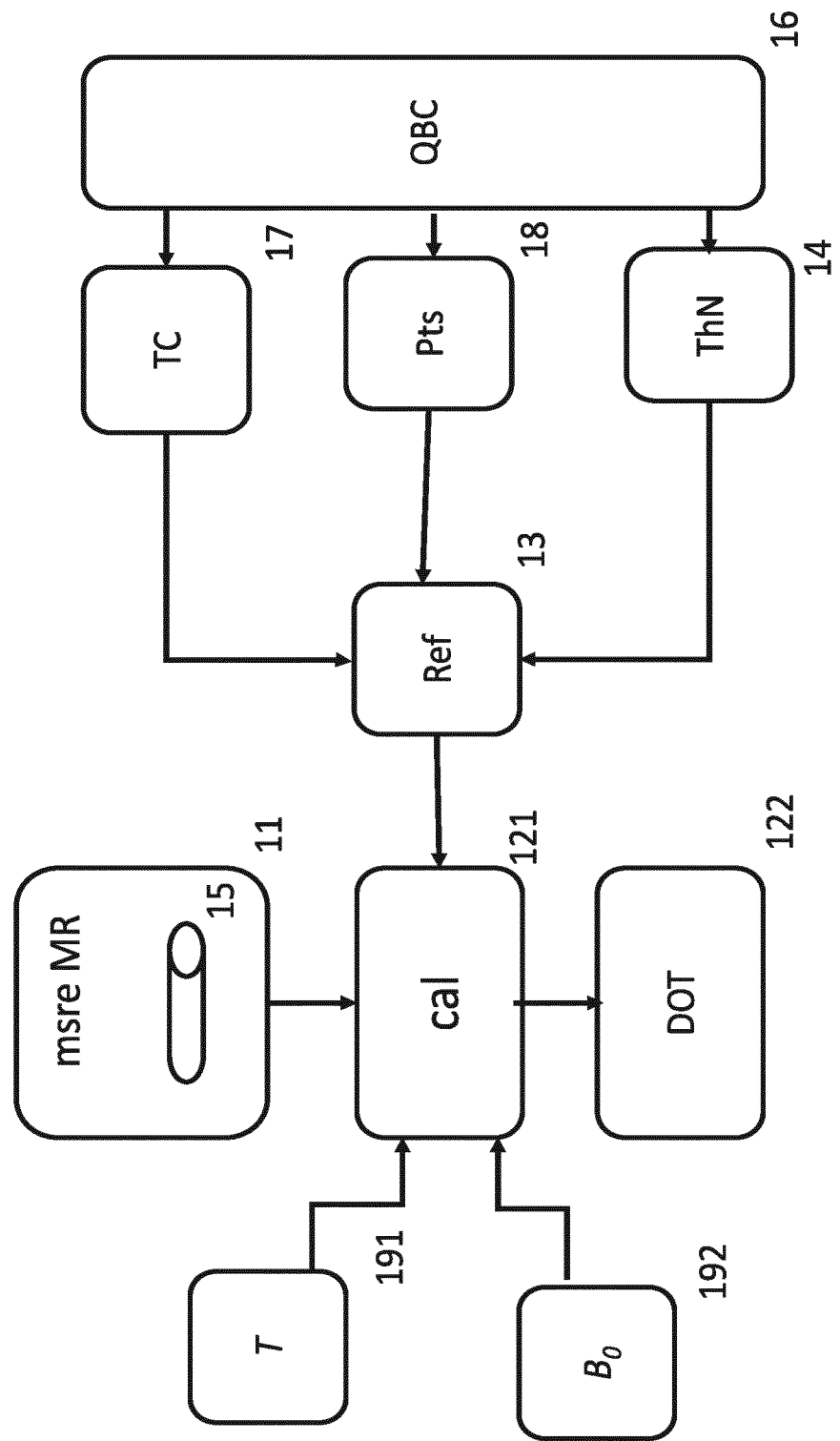
FIG. 1 shows a diagrammatic representation of the magnetic resonance imaging method of the invention and FIG. 2 shows a diagrammatic representation of the use of the invention in a longitudinal study.

FIG. 1 shows a diagrammatic representation of the magnetic resonance imaging method of the invention. The magnetic resonance imaging method involves acquisition 11 of magnetic resonance signals by way of an acquisition sequence. The acquisition sequence includes one or more radiofrequency (RF) excitations to rotate the excess spins orientated anti-parallel to the main magnetic field, i.e. the longitudinal magnetization to some degree to the transverse orientation. The acquisition sequence may also include gradient magnetic field pulses, e.g. for spatial encoding of the magnetic resonance signals. Other RF pulses and/or gradient pulses may be employed for manipulating the spins, such as for inversion or refocusing of the spins. The magnetic resonance signals are measured by way of a receiver antenna, notably an RF receiver coil. 15. From the acquired magnetic resonance signals the calibrated signal levels in terms of a relative density of ordered transverse spins (DOTS) 122 are computed 121. To that end the measured magnetic resonance signals are calibrated 121 to a reference level 13. The reference level may be obtained from the thermal-noise 14 of a receiver antenna with a spatial homogeneous sensitivity profile. For a cylindrically shaped homogenous load, the signal-to-thermal-noise ratio (SNR) (i.e. the theoretically estimated signal-to-thermal-noise ratio) due to thermal-noise of the signal from a voxel at position r generated by the rotating transverse nuclear spins is expressed as $$SNR(r) = \frac{\omega_0 V_{sample} |M \cdot B(r)|}{\sqrt{16 k_B T \Delta f P_L}} \quad (1)$$

where $\omega_0$ is the Larmor frequency, the voxel-volume is $V_{sample}$ and $\Delta f$ is the sampling bandwidth. Further, the magnetization of the substance in the voxel is M, and B(r) is the magnetic field per unit of electrical current the coil produces at the position r of the voxel. Further $P_L$ is the power loss in due to the load per unit of electrical current in the receiver coil. Equation (1) implies that the signal-to-thermal-noise ratio is linear proportional with the magnetization and thus relates linear to the density of excess spins-up that contribute to the signal.

For a sample of fully relaxed and then fully excited (FRFE) water one may derive from equation (1) that $$SNR_{FRFE}(r) = \sqrt{N_p N_a N_s} \sqrt{\frac{Q}{\Delta f}} V_s K_{sys} F(T) K, \quad (2)$$

where $N_p$ is the number of k-space profiles contributing to the voxel, $N_a$ is the number of signal averages and $N_s$ is the number of signal samples per profile. These numbers pertain to the acquisition sequence and may be set by the user. The resonance quality factor of the loaded antenna is denoted by Q which is a measurable property of the loaded receiver antenna. The constant $K_{sys}$ includes the flux-capturing area and the self-induction of the receiver antenna with the applied magnetic field strength at which the measurement is made. The temperature dependence is denoted by the function F(T) of temperature that accounts for thermal expansion of the FRFE-water in the voxel as well as the Gibbs distribution of, in the specific case that the nucleus is the proton, excess protons or more generally atomic nuclei with spin such as 13C, 23Na, 31P that are anti-parallel relative to excess protons or atomic nuclei that are parallel to the applied magnetic field. The constant K is a concoction of physical constants. This produces an absolute signal-to-thermal-noise ratio for a (fictitious) fully relaxed and then fully excited substance, e.g. water. Signals from a subject to be examined may be related to this uniform fixed reference signal-to-thermal-noise ratio. Now it is concluded that given the system characterization represented by $K_{sys}$, temperature and the separately measured or computed value of Q and the acquisition details, the expression of Eq. (2) returns an absolute value of the signal-to-thermal-noise ratio ($SNR_{FRFE}$) for FRFE water. This provides an absolute reference. Viz. the signal-to-thermal-noise level ($SNR_{measured}$) can be obtained by measuring under the experimental conditions (same coil, load, receiver settings), e.g. by sampling the signals during e.g. one second in absence of any spin excitation. The signals received during the actual experiment can be related to that noise level, which leads to $SNR_{measured}$. The measurement of the $SNR_{measured}$, i.e. of a tissue voxel may then related to the absolute reference of the $SNR_{FRFE}$ for the circumstances at hand to obtain the density of ordered transverse spins in the tissue voxel. In fact:

$$\frac{DOTS_{tissue}}{DOTS_{FRFE}} = \frac{SNR_{measured}}{SNR_{FRFE}}$$

The reference level may also be obtained by measuring the magnetic resonance signals by a reference receiver antenna 16 having a spatially uniform sensitivity profile. A quadrature body coil (QBC) has the required spatially uniform sensitivity profile. In one example, the reference level is derived from the thermal-noise 14 generated in the reference receiver antenna. Alternatively, the reference receiver antenna may be employed to pick up an RF signal from the tickler coil 18 that is configured to transmit a well-controlled stable signal in the MR frequency band. In yet another alternative, the reference level 13 may be obtained from the magnetic resonance signals acquired with the QBC that originate from a portion 18 of the subject that has an a priori determined content. For example the magnetic resonance signal level originates from a location in the body of a patient to be examined of which is a priori known what tissue-type is that location. The magnetic resonance examination system of the invention also includes a temperature sensor 191 to measure the temperature T at which the magnetic resonance signals are acquired. The measured temperature may be taken into account in the calibrated signal levels recorded in terms of DOTS Hence, results from different magnetic resonance examinations at different temperatures can be meaningfully compared. Further the main magnetic field strength may be measured as the precise actual field strength in a field sensor 192, or alternatively a fixed value for the field strength, i.e. the nominal value of the magnetic resonance examination system's main field strength may be stored.

Figure 2:
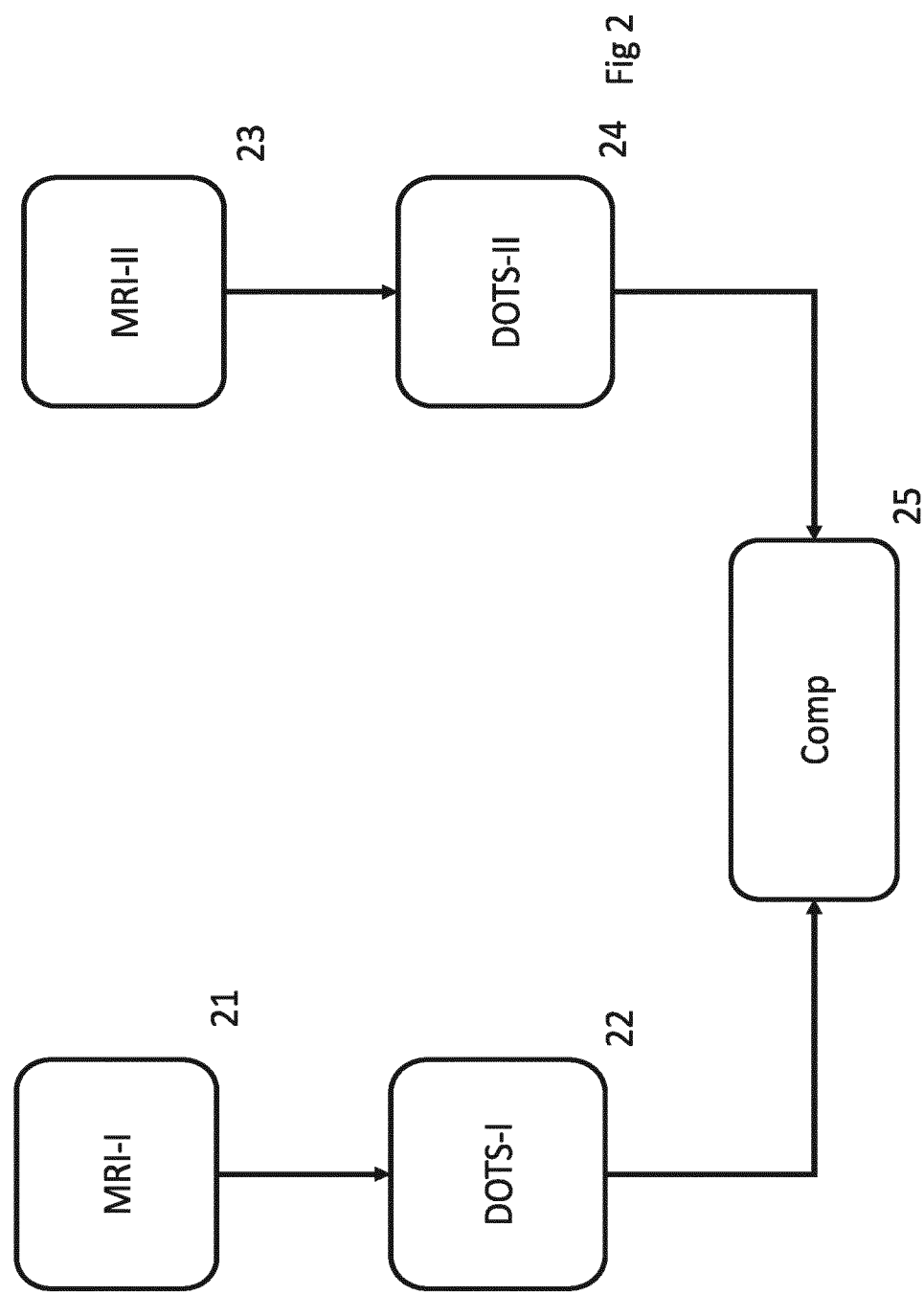

FIG. 2 shows a diagrammatic representation of the use of the invention in a longitudinal study. A magnetic resonance examination, e.g. including acquiring and reconstructing magnetic resonance images is performed by way of a first magnetic resonance examination system 21 in which the present invention is incorporated. The measured magnetic resonance signals from the first magnetic resonance examination system are calibrated with respect to the uniform reference level, e.g. the thermal-noise of the first magnetic resonance examination system's quadrature body coil (QBC). The calibrated signal levels are represented in DOTS 22. Another magnetic resonance examination is made by a second magnetic resonance examination system 23. The measured magnetic resonance signals from the second magnetic resonance examination system are also calibrated to the uniform reference, which may be the thermal-noise level of the second magnetic resonance examination system's QBC. The calibrated signal levels from the second magnetic resonance examination system are also represented in DOTS 24. The respective calibrated MR datasets, both represented in DOTS from the respective magnetic resonance examination system can be meaning fully compared in a compression stage 25.

Similarly, meaningful comparison may be made of calibrated MR-datasets represents, whether or not in DOTS, that are made by the same magnetic resonance examination system at different instants in time and/or from the same or different subjects, e.g. examined patients.

The invention claimed is:

1. A magnetic resonance examination method comprising:
   acquisition of a set of magnetic resonance signals from magnetic spins in an object by way of a receiver antenna,
   relating the magnetic resonance signals' signal levels to an independent reference level that is independent of the receiver antenna's sensitivity to form one or more calibrated signal levels of the magnetic resonance signals; and
   recording the calibrated signal levels in terms of a relative density of ordered transverse spins (DOTS).

2. The magnetic resonance examination method claim 1, wherein two or more sets of the set of magnetic resonance signals from magnetic spins in an object are acquired by one or more respective receiver antenna (e),
   the magnetic resonance signals' signal levels are related to the independent reference level that is independent of the receiver antenna's sensitivity to form one or more calibrated signal levels of the magnetic resonance signals,
   the calibrated signal levels are recorded in terms of the relative density of ordered transverse spins (DOTS);
   and the calibrated signals of the respective sets of magnetic resonance signals in terms of the relative density of ordered transverse spins (DOTS) are compared to each other.

3. The magnetic resonance examination method of claim 1 further comprising:
   determining the independent reference level from a measurement of a signal-to-thermal-noise ratio of the receiver antenna; and
   calibrating the measured signal-to-thermal-noise ratio in terms of the relative density of ordered transverse spins (DOTS) by relating the measured signal-to-thermal-noise ratio to a computed theoretical signal-to-thermal-noise ratio.

4. The magnetic resonance examination method of claim 3 further comprising:
   accessing the receiver antenna's resonance quality factor; and
   computing the computed theoretical signal-to-thermal-noise ratio from the receiver antenna's resonance quality factor.

5. The magnetic resonance examination method of claim 4, further including:
   determining the receiver antenna's resonant quality factor from the receiver antenna's resonance frequency response characteristic.

6. A magnetic resonance examination method including;
   comparing respective sets of calibrated signals record in DOTS,
   wherein said respective sets of calibrated signals originate from multiple acquisitions of sets magnetic resonance signals as claimed in claim 2.

7. The magnetic resonance examination method of claim 1, further comprising:
   reconstructing a magnetic resonance image from the calibrated signals recorded in DOTS.

8. The magnetic resonance examination method of claim 1, further comprising:
   recording the object's temperature during acquisition of the magnetic resonance signals; and
   taking the recorded temperature into account in the recording of the calibrated signal levels in terms of a relative density of ordered transverse spins.

9. A magnetic resonance examination system configured to perform the magnetic resonance examination method of claim 1.

10. A computer program including instructions stored on a non-transitory computer readable medium for carrying-out the magnetic resonance examination method of claim 1.

11. The magnetic resonance examination method of claim 1, further including: reconstructing a magnetic resonance image from the acquired magnetic resonance signals and brightness values of the magnetic resonance image are expressed in DOTS.

12. The magnetic resonance examination method of claim 5, wherein the receiver antenna's resonance frequency response characteristic is the frequency width of said response.

* * * * *